No. 755,193. Patented March 22, 1904.

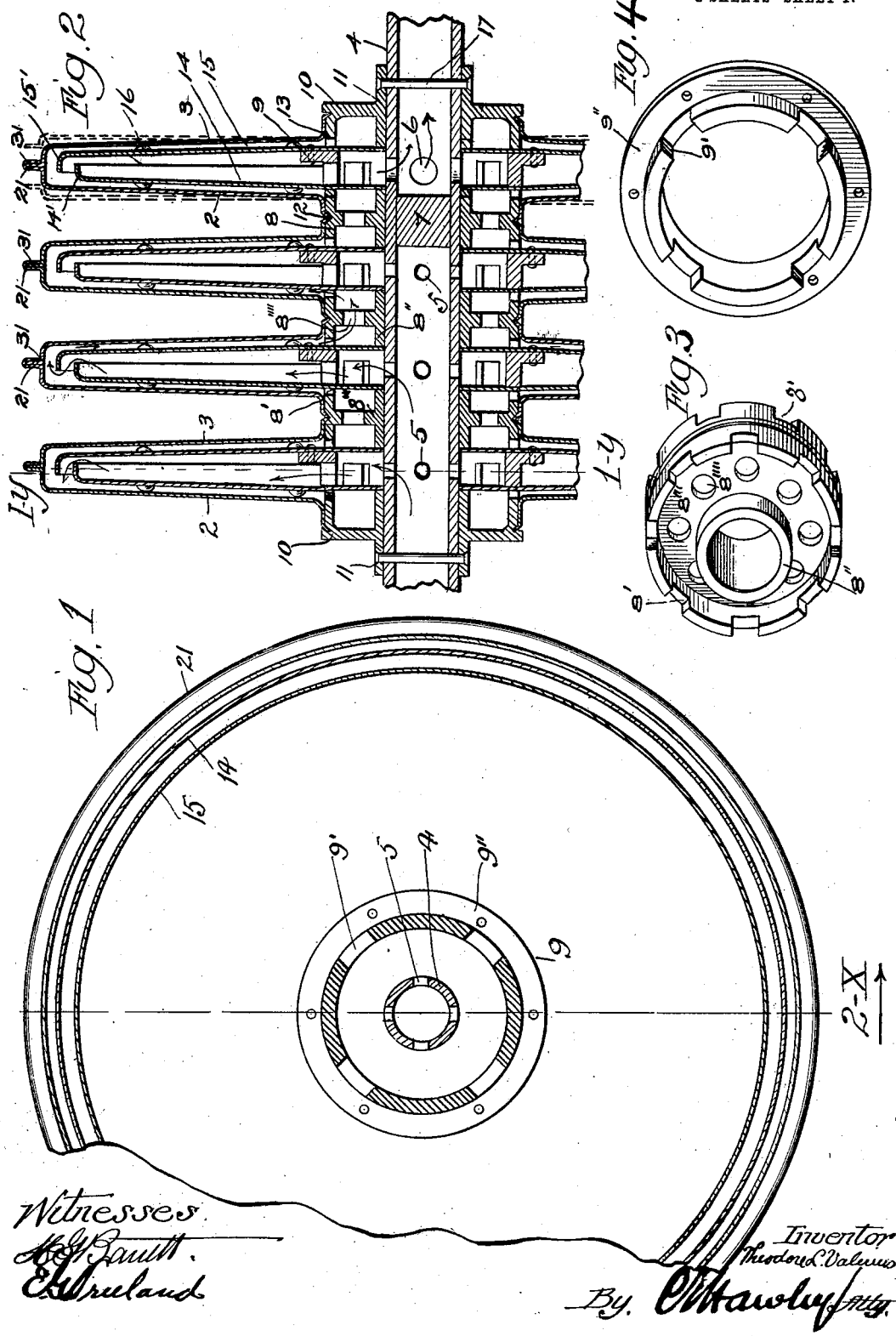

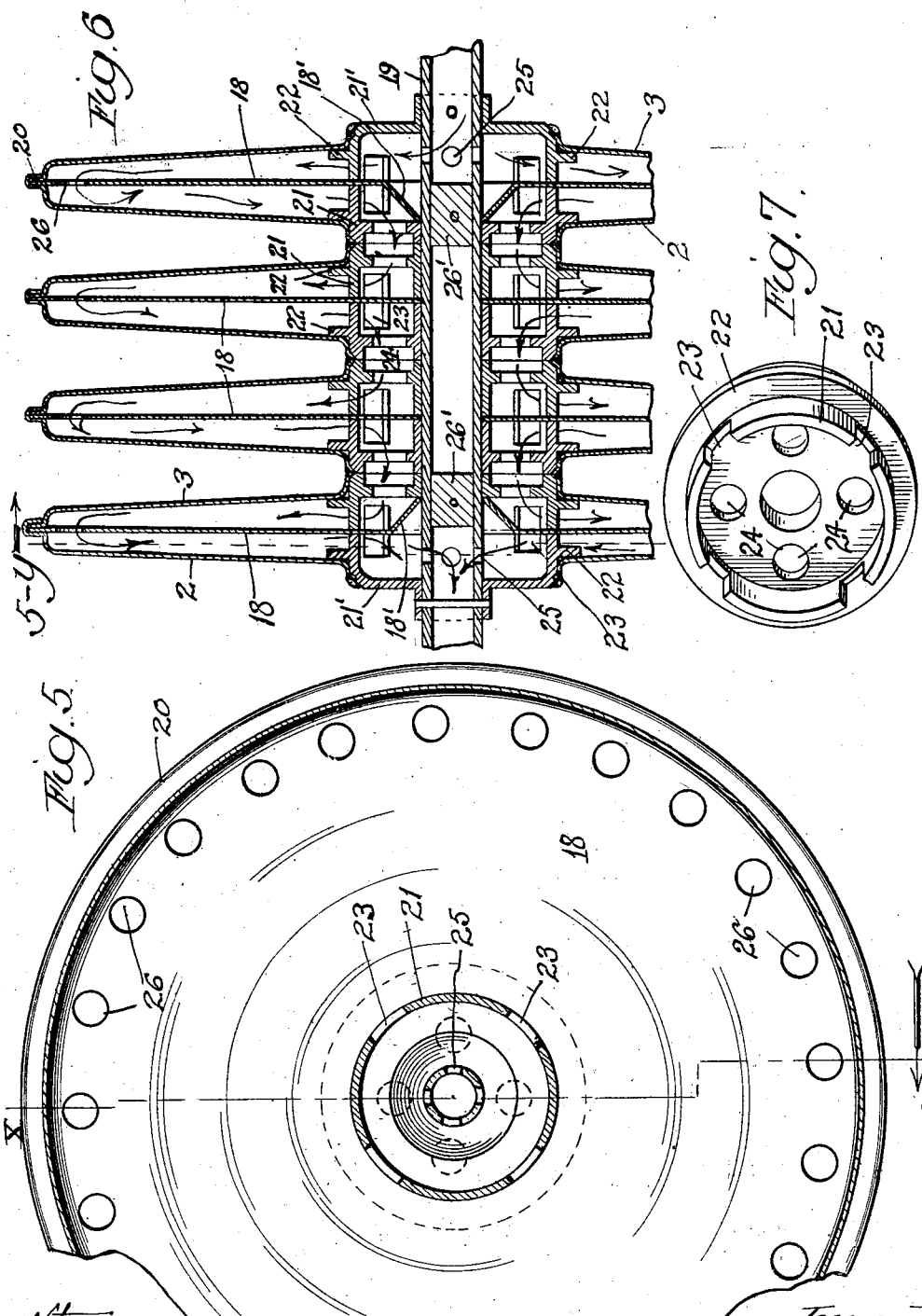

UNITED STATES PATENT OFFICE.

THEODORE L. VALERIUS, OF FORT ATKINSON, WISCONSIN, ASSIGNOR TO CREAMERY PACKAGE MANUFACTURING COMPANY, OF CHICAGO, ILLINOIS, A CORPORATION OF ILLINOIS.

ROTARY HEATER OR COOLER.

SPECIFICATION forming part of Letters Patent No. 755,193, dated March 22, 1904.

Application filed January 24, 1903. Serial No. 140,398. (No model.)

*To all whom it may concern:*

Be it known that I, THEODORE L. VALERIUS, a citizen of the United States, residing at Fort Atkinson, in the county of Jefferson and State of Wisconsin, have invented certain new and useful Improvements in Rotary Heaters or Coolers, of which the following is a specification.

My invention relates to machines for heating and cooling liquids, and has particular reference to means for heating, cooling, or pasteurizing milk, cream, and the like. The most successful of the machines thus far devised for this purpose have been of the disk type—that is, comprising a plurality of disks having a common axis and revoluble in the vat or tank that contains the liquid. These disks, according to the work to be done, are heated or cooled by the fluid that is passed through the several disks and which tempers the walls of the disks. In manufacturing these machines I have experienced much difficulty in assembling and securing the parts that make up the several disks and have experienced still greater difficulty in keeping the disks in proper shape during any considerable period of use. The constant expansion and contraction thereof from changes of temperature is so severe as to bulge and warp the disks and also throw them out of line. The disks made heretofore have each comprised two parallel thin sheet-metal parts having central openings for the supporting-shaft and which have been placed upon the shaft in their normal condition just as they came from the punching-dies upon which they were stamped. Said disks when placed in use quickly develop considerable slack, evidenced in the warping and bulging of the disks and rendering them unsightly and to a certain extent ineffective. Observing these results I conceived that the fault was due to the slack of the metal composing the disks and that the bad results could be avoided by placing the two sides of each disk under strain to force their centers outward, take up the slack of the metal, and truss the sides of the disk; and my invention consists in a hollow disk of sheet metal, the original dimensions of which are uniform throughout, but which before or upon assemblage with other parts is expanded at the center to give the disk a lens-like cross-section and firmly truss the disk sides.

My invention consists, further, in various details of construction and in adaptations of my invention to both heaters and coolers, all as hereinafter described, and particularly pointed out in the claims.

My invention will be more readily understood by reference to the accompanying drawings, forming a part of this specification, and in which—

Figure 1 is a cross-section of a rotary heater member on the line $1^y$ of Fig. 2. Fig. 2 is a longitudinal section of the same on the line $2^x$ of Fig. 1. Fig. 3 is a perspective view of one of the separating-collars of the heater member or element. Fig. 4 is a perspective view of one of the intermediate ring-separator collars of the device. Fig. 5 is a transverse section of a rotary cooler element on the line $5^y$ of Fig. 6. Fig. 6 is a longitudinal section of the same on the line $6^x$ of Fig. 5, and Fig. 7 is a perspective view of one of the separator-collars of the rotary cooler.

The rotary device herein shown is in actual use employed with a vat or tank wherein the same is immersed in the fluid to be cooled or heated, and suitable means are provided for rotating the same; but as this invention pertains to the construction of the rotary element of the heater or cooler rather than to the construction or operation of such a machine as a whole I have deemed it unnecessary to illustrate an entire complete heating and cooling machine. The drawings therefore are confined to the illustration of the rotary element, showing its construction as varied in heaters and coolers. Both constructions shown are employed in the machine—that is, in a pasteurizer the milk or cream is first heated to a high temperature by a rotary heater of the construction illustrated and is then quickly cooled by the operation of a cooler like that shown in Figs. 5 to 7 of the drawings. The essential feature of my invention is present in both of the devices shown and will be clearly understood by reference to either Fig. 2 or Fig. 6. As herein shown, the rotary member comprises a plurality of circular hollow disks. Each of these disks is made up of two thin sheet-metal disks 2 3, the outer edges of which are fastened together, while the inner portions of the disks are forcibly held apart by a spreader or separator of suitable construction. The light hollow disk which would otherwise be flexibly attached to the central hub or shaft is thus made rigid thereon and the slack of the metal is taken up to such an extent that there is little likelihood that the disk will ever bulge or warp because of pressure of steam within it or changes of temperature. This construction and result is secured by placing suitable spreader parts in the disk and then putting the two sides together and fastening the rim flanges of one upon the other. It requires considerable force to press the peripheral flanges of the sides together, as the sides are thereby put under strong tension, causing a heavy pressure between the centers of the disks. Because of the force required to spring and stretch the sides of the disks I find it necessary to employ a special machine-former for holding and swaging the peripheral flanges, notwithstanding the fact that the disks are composed of thin sheet metal and are normally quite weak and flexible. The disks if made of thicker material would have little effect upon the liquid under treatment, as thick metal disk-walls would prevent the rapid imparting or absorption of heat thereby. Hence the necessity of the light and yet strong, or, as it may be termed, "tension" construction of the disks.

Referring again to Figs. 1 to 4 of the drawings, 4 represents the tubular shaft of the rotary heating member through which the steam and hot water used in the disks is introduced to and conducted away from the hollow disks. This shaft 4 is provided with a series of steam and water inlet holes 5 and also a number of outlet or drain holes 6, the two sets of holes being separated by a plug or partition 7 in the shaft 4. Upon the shaft is a hub composed of a series of collars 8, separators 9, and end collars or closures 10. The end collars are provided with the central sleeves or bosses 11, that are pinned to the shaft 4. Each separator-ring 9 comprises the ring portion having a series of notches 9' and a wide flange 9". Each separating-collar 8 comprises a ring portion having a number of notches 8' in its edges and joined to the central boss 8" by a web 8''', containing the holes 8''''. The outer and inner portions of the collar 8 are of the same length. The collars 10 and 8 are provided with flange-grooves 12 to fit the central flanges 13 of the disk sides 2 3, supporting the disks upon the shaft 4. As soon as the collars are pressed into the central openings of the disks the disk-flanges 13 are swaged into the flange-grooves 12 of the collars to secure them in place. The joints are afterward soldered or plated to make them tight.

14 and 15 represent two deflecting or baffle disks, which are placed within each hollow disk. These have small central openings that fit the shaft 4 and are also provided with a number of protuberances 16, which serve to separate the disks 14 and 15 from the walls or sides 2 3 of the hollow disk. The collars 9 are in each case riveted to one of the disks 14 15, being thereby held in alinement with the other collars. The disks 14 and 15 are provided with peripheral flanges 14' and 15', which turn inwardly, leaving a peripheral opening between the edges of the disks 14 and 15.

The method of assembling the several parts of the heater is as follows: The sides are first secured upon the collars 8 and 10 by the swaging of their flanges 13 in the grooves of said collars or hub-sections. One of the collars 10, with its disk, is then placed upon the shaft 4 and there secured, as by a pin 17. An inside baffle-disk is then slipped onto the shaft, then the next baffle-disk, and thereafter a collar 8, with the disk sides upon it, is placed in position. In this manner the several hub-sections, with the disk parts attached to them, are placed upon the shaft and the opposite end collar 10 is pressed up to force the hub parts firmly together. That collar is then pinned to the shaft and the device is ready to be completed by the swaging together of the peripheral flanges 21 31 of the hollow disks. To accomplish this, it is necessary to exert considerable force to press the flanges of each disk together, as the spring of the sides 2 and 3 and also the spring of the inner baffle-plates must be overcome. When the said peripheral flanges have been brought together, they are secured in any suitable manner, as by swaging one flange over the other and afterward soldering or sweating them together. It is obvious that the disks may be swaged one at a time as each is assembled on the shaft.

The operation of this heating device is as follows: The heating-disks are rotated by means of power applied to the shaft 4, and the disks are wholly or partially immersed in the fluid under treatment. The steam under light pressure is admitted to the shaft 4 and, passing through the holes 5, escapes into the spaces between the baffle-disks 14 and 15 in the hollow disks. Upon expanding into these spaces and coming into contact with the baffle-disks the steam is quickly condensed, and the water of condensation falls into the lower parts of the hollow disks. As the disks are in rotation the narrow spaces between the disk 14 and the sides 2 and 3 of the hollow disks are quickly filled with films of hot water, the temperature of which, of necessity, is less than 212°. By reason of this fact and because the live steam is condensed before it can reach the inner walls of the hollow disk all danger of scorching or boiling the milk or cream under treatment is avoided. The water of condensation is driven from one disk to the other through the openings 8'''' of the intermediate collars and finally reaches the last disk upon the shaft, wherein it enters the spaces between the baffle-disk and is discharged therefrom into an opening 6 into the hollow shaft 4. By this time the temperature of the water has been greatly reduced by the absorption of heat from the disks by the body of liquid wherein the disks rotate and the water leaving the heater will be quite cool. The ecomomy obtained in operation is thus proven.

Referring now to Figs. 4 to 7 of the drawings, it will be seen that the construction of the cooler device differs somewhat from that of the heater. Although a cold fluid may be circulated through the heater-disks, thereby constituting the same a cooler, I prefer to construct the cooler in a special manner, simplifying and cheapening this construction as compared with the heater. The same invention is embodied in the cooler; but the spreading of the disk sides is secured by somewhat-different devices. I here employ but one inside partition-disk 18 in each hollow disk. This disk 18 fits upon the shaft 19 of the cooler and its outer edge is secured between the peripheral flanges 20 of the sides of the hollow disk. Two separators or spreading-collars 21 are provided for each cooler-disk. These are provided with flanges 22 and abut upon the middle or partition disk 18, holding the same in place. The distance between the flanges 22 of the collars of each disk is greater than the width of the disk at its periphery, and it is therefore necessary to force the sides of the disk together in the manner before explained in order to swage the peripheral flanges thereof. I thus place the sides of the disk under strain. In detail each separator or hub section comprises the ring having the flange 22 and provided with a number of notches 23, that communicate with the disks. The webs of the collars are provided with openings 24, so that there is a free passage between each pair of hollow disks. The end separators or collars 21', which have closed end webs, have no inwardly-projecting bosses as such and unless accurately placed would cover the openings 25 in the shaft 19. Because there is no boss upon the end collar it would be difficult to make a tight joint between the disk 18 and the pipe 19. I therefore leave the boss off of the second collar also and provide the end disk with a conical center 18', which abuts against a second collar and, being pressed firmly into place by the end pressure on the several collars of the hub, makes a tight joint with the shaft. 26' 26' are plugs placed in the hollow shaft. These compel the liquid entering one end to pass through all of the disks before it can escape from the other end of the shaft.

The operation of my cooler is as follows: The cooling fluid enters the shaft, as shown by the arrows, and, passing through the openings 25 and the notches 23 of the end collar 21', flows into the hollow disk. It moves from the first half of the disk into the other half through the openings 26 near the periphery of the partition-disk 18. From thence the fluid passes back to the hub of the group entering the hub through notches in the collar 21 and flowing thence through the openings 24, leading into the next disk. Thus the liquid progresses from disk to disk and finds its escape through the last half-disk, the hub, and the openings 25 in the discharge end of the pipe 19. No particular pressure of fluid is required, and the disks need not be entirely filled, as their constant rotation insures the cooling of the disk-walls entire.

It is obvious that the form, construction, and appearance of the heater and cooler herein shown and described may be modified without departing from the spirit of my invention, and I therefore do not confine the invention to the specific constructions herein shown and described.

Having thus described my invention, I claim as new and desire to secure by Letters Patent—

1. The heater and cooler disk comprising thin metal disk sides having central openings and secured together at their peripheries in combination with the spreading means that distend the central portion of the disk, holding its sides under tension; substantially as described.

2. In a rotary heater or cooler, the combination, of the hollow hub composed of a plurality of collars, with deflecting-plates 15 and 15 arranged between said collars and the hollow disks inclosing said plates and arranged upon said collars, and said disks being held distended at their centers by said collars; substantially as described.

3. In a rotary heater, the combination, of the shaft, with the hub-collars thereof and deflecting-disks held in said hub, a suitable spreader, and the hollow disk secured upon said hub, having an expanded center and holding said deflecting plates or disks under pressure; substantially as described.

In testimony whereof I have hereunto set my hand, this 19th day of January, 1903, in the presence of two witnesses.

THEODORE L. VALERIUS.

Witnesses:
  H. H. CURTIS,
  W. W. CORNISH.